United States Patent
Tamura

(10) Patent No.: US 6,961,254 B2
(45) Date of Patent: Nov. 1, 2005

(54) INSULATING SWITCHING DC/DC CONVERTER

(75) Inventor: Yoshimoto Tamura, Higashiyatsushiro-gun (JP)

(73) Assignee: Denso Corporation, Kariya (JP)

(*) Notice: Subject to any disclaimer, the term of this patent is extended or adjusted under 35 U.S.C. 154(b) by 15 days.

(21) Appl. No.: 10/790,826

(22) Filed: Mar. 3, 2004

(65) Prior Publication Data

US 2004/0179378 A1 Sep. 16, 2004

(30) Foreign Application Priority Data

Mar. 11, 2003 (JP) ........................................ 2003-064807
Feb. 3, 2004 (JP) ........................................ 2004-027086

(51) Int. Cl.⁷ .............................................. H02M 7/68
(52) U.S. Cl. ...................... 363/89; 363/90; 363/21.03
(58) Field of Search .......................... 363/89, 90, 91, 363/21.02, 21.03, 127

(56) References Cited

U.S. PATENT DOCUMENTS 6,064,580 A    5/2000  Watanabe et al.
6,396,719 B2 *  5/2002  Morita et al. ............. 363/21.12

FOREIGN PATENT DOCUMENTS

JP          A 11-262263         9/1999

OTHER PUBLICATIONS

Watanabe, Haruo et al., "BHB (Boost Half Bridge) Power Supply," *The Institute of Electronics, Information and Communication Engineers*, Technical Report of IEICE, EE98–17, (Jul. 1998), pp. 27–34.
Watanabe, Haruo, "High Efficiency On–board Power Supply using Boost Half Bridge Method," *Switching Power Supply Symposium 2000*, Japan Management Association, B2–2.
Matsuda, Yoshiaki, "Low Voltage Output High Efficiency DC/DC Converter," *Switching Power Supply Symposium 2001*, Japan Management Association, A2–3.

* cited by examiner

*Primary Examiner*—Shawn Riley
(74) *Attorney, Agent, or Firm*—Oliff & Berridge, PLC

(57) ABSTRACT

In a DC/DC converter using an insulating transformer Tr having a center tap on the secondary side, an input choke coil L1 and an output choke coil L3 are integrated with the insulating transformer Tr, a primary coil (number of turns: 2N) and a secondary coil (number of turns: n+n) of the transformer, the input choke coil L1 (number of turns: 2N), and the output choke coil L3 (number of turns: n) are wound around a common core (magnetic core), and the coils are arranged in directions of canceling DC fluxes generated by the coils, so that the DC bias magnetization is considerably reduced.

7 Claims, 17 Drawing Sheets

MODE 1

MODE 2

MODE 3

MODE 4

MODE 5

MODE 6

Tr PRIMARY CIRCUIT IS OMITTED

Tr PRIMARY CIRCUIT IS OMITTED

Tr PRIMARY CIRCUIT IS OMITTED

Tr SECONDARY CIRCUIT IS OMITTED

Tr SECONDARY CIRCUIT IS OMITTED

INSULATING SWITCHING DC/DC CONVERTER

BACKGROUND OF THE INVENTION

1. Field of the Invention

The present invention relates to a switching power supply and particularly relates to a technique for achieving higher efficiency and miniaturization of an insulating switching DC/DC converter.

2. Description of the Related Art

Conventionally switching power supply circuits using the Boost Half Bridge (BHB) method are proposed in which a booster circuit and a half bridge circuit are integrated (Reference 1, Reference 2, Reference 3, Reference 4). FIG. 29 shows a circuit configuration proposed in Reference 3. In FIG. 29, reference character E designates an input voltage source, reference numeral L1 designates an input choke coil, reference numeral L2 designates an output choke coil, reference numeral $C_O$ designates an output smoothing capacitor, reference numeral $R_O$ designates a load resistance, and reference numeral $V_O$ designates an output DC voltage.

According to the circuit of the BHB method shown in FIG. 29, the input voltage source E is connected via the input choke coil L1 to the midpoint of two switching devices (FET1, FET2) having a half-bridge configuration, and the secondary winding current of a transformer T is subjected to full-wave rectification by two synchronous rectification MOSs (FET3, FET4). Further, the two switching devices (FET1, FET2) are controlled in a complementary manner.

According to Reference 4, a configuration for incorporating a booster choke into the primary winding of a transformer in the BHB method is proposed.

[Reference 1] Japanese Patent Application Publication No. 11-262263

[Reference 2] Haruo Watanabe and other two, "BHB (Boost Half Bridge) power supply," Technical Report of IEICE, The Institute of Electronics, Information and Communication Engineers, EE98-17 (1998–07), pp. 28–34

[Reference 3] Haruo Watanabe, "High Efficiency On-board Power Supply using Boost Half Bridge Method," Switching Power Supply System. Symposium 2000, Japan Management Association, B2-2

[Reference 4] Yoshiaki Matsuda, "Low Voltage Output High Efficiency DC/DC Converter," Switching Power Supply System Symposium 2001, Japan Management Association, A2-3

However, in the circuit configurations having been conventionally proposed, although the output is reduced in ripple voltage and ripple current, the core of magnetic components (input choke coil, output choke coil, and transformer) is considerably increased in total DC bias magnetization, so that the core has a large volume and the overall apparatus has low efficiency.

SUMMARY OF THE INVENTION

The present invention is developed in view of such circumstances and has its object the provision of a switching DC/DC converter which reduces the core volume and core losses of magnetic components and improves the efficiency of the overall apparatus.

In order to attain the above object, the present invention provides an insulating switching DC/DC converter, in which a DC voltage source is connected to the primary side of an insulating transformer, voltage is transformed by alternately turning on/off a first switching device and a second switching device so as not to simultaneously turn on the switching devices, the first and second switching devices being connected to the primary side, and the output of DC voltage is obtained via the secondary rectifier circuit of the insulating transformer, wherein the insulating transformer has a center tap on the secondary side, an input choke coil, the primary coil of the insulating transformer, the secondary coil of the insulating transformer, and an output choke coil are wound around a common core, the coils are arranged in directions of canceling DC fluxes generated by the windings of the coils, a primary circuit is formed on the primary side of the insulating transformer, the primary circuit being configured so that a series circuit of the input choke coil and the first switching device is connected across the terminals of the DC voltage source, a series circuit of a first capacitor and the primary coil is connected across the terminals of the first switching device, and a series circuit of the second switching device and a second capacitor is connected across the terminals of the first switching device, and a secondary circuit is formed on the secondary side of the insulating transformer, the secondary circuit including a first rectifying device connected to a first secondary coil divided by the center tap in the secondary coil, a second rectifying device connected to a second secondary coil, the output choke coil fed with current having been rectified by the first and second rectifying devices, and an output smoothing capacitor connected to the output choke coil.

According to the present invention, in the DC/DC converter using an insulating transformer having the center tap on the secondary side, the input choke coil and the output choke coil are integrated with the insulating transformer, the primary coil and the secondary coil of the transformer and the input/output choke coils are wound around the same core (magnetic core), and the number of turns and the winding directions of the coils are designed in directions of canceling DC fluxes generated by the coils, so that the DC biased magnetization of the core is considerably reduced. Thus, it is possible to greatly miniaturize the volume of the core and reduce core losses as compared with the conventional art, thereby achieving a high-efficiency apparatus.

Another aspect of the present invention has a primary circuit configured so that a connecting point of the series circuit of the second capacitor and the second switching device is changed in the primary circuit, and the series circuit of the second capacitor and the second switching device is connected in parallel with the input choke coil between the positive terminal of the DC voltage source and the negative terminal of the input choke coil.

Further, the secondary circuit may be configured so that the center tap is connected to the ground and the output choke coil is connected to the first rectifying device and the second rectifying device, and may be configured so that the output choke coil is connected to the center tap.

Further, a combined transformer having a first secondary coil and a second secondary coil on the secondary side may be used instead of the insulating transformer using the center tap method.

In this aspect, the input choke coil, the primary coil of the insulating transformer, the first secondary coil, the second secondary coil, and the output choke coil are wound around the common core, the coils are arranged in directions of canceling DC fluxes generated by the coil windings, a primary circuit is formed on the primary side of the insulating transformer, the primary circuit being configured so that the series circuit of the input choke coil and the first switching device is connected across the terminals of the DC voltage source, the series circuit of the first capacitor and the primary coil is connected across the terminals of the first switching device, and the series circuit of the second switching device and the second capacitor is connected across the terminals of the first switching device, and a secondary circuit is formed on the secondary side of the insulating transformer, the secondary circuit including the first rectifying device connected to the first secondary coil, the second rectifying device connected to the second secondary coil, the output choke coil fed with current having been rectified by the first and second rectifying devices, and the output smoothing capacitor connected to the output choke coil.

The primary circuit may also be configured so that a connecting point of the series circuit of the second capacitor and the second switching device is changed in the primary circuit using the combined transformer, and the series circuit of the second capacitor and the second switching device is connected in parallel with the input choke coil between the positive terminal of the DC voltage source and the negative terminal of the input choke coil.

As described above, according to the present invention, in the insulating switching DC/DC converter using the center tap method or the combined transformer that have a plurality of coils on the secondary side of the transformer, the input choke coil and the output choke coil are integrated with the insulating transformer, the primary coil and the secondary coil of the transformer and the input/output choke coils are wound around the same core, and the coils are arranged in directions of canceling DC fluxes generated by the coils, so that the DC bias magnification of the core is greatly reduced. Thus, it is possible to considerably reduce the volume of the core and reduce core losses as compared with the conventional art, thereby achieving a high-efficiency apparatus.

DETAILED DESCRIPTION OF THE PREFERRED EMBODIMENTS

Preferred embodiments of the present invention will be described in detail in accordance with the accompanying drawings.

Figure 1:
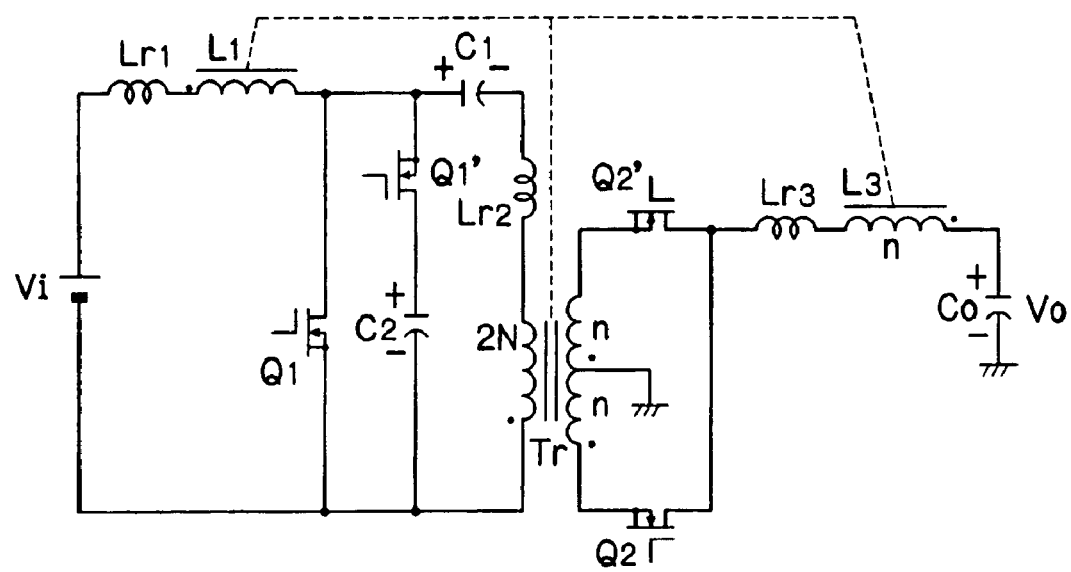
FIG. 1 is a circuit diagram showing a DC/DC converter according to Embodiment 1 of the present invention.

FIG. 1 is a circuit diagram showing a DC/DC converter (step-up active clamp half-bridge converter). In FIG. 1, reference character Vi designates an input power supply, reference numeral Lr1 designates a leakage inductance, reference numeral L1 designates an input choke coil (2N: the number of turns, N: natural number), reference numerals Q1 and Q1' designate switching devices using FETs, reference numeral C1 designates a DC component removing capacitor, reference numeral C2 designates a clamp capacitor, reference numeral Lr2 designates a leakage inductance, reference character Tr designates an insulating transformer having a center tap on the secondary side (2N: the number of turns of a primary coil, n, n: the number of turns of a secondary coil, n: natural number), reference numerals Q2 and Q2' designate switching devices acting as synchronous rectifying devices, reference numeral Lr3 designates a leakage inductance or a sum of an external insertion inductance and a leakage inductance, reference numeral L3 designates an output choke coil (n: the number of turns), reference numeral $C_0$ designates an output smoothing capacitor, and reference numeral $V_O$ designates an output DC voltage. Although MOSFETs are used as the switching devices Q1, Q1', Q2, and Q2' in the present embodiment, other semiconductor devices may be used in the implementation of the present invention.

The input/output choke coils L1 and L3 are integrated with the transformer Tr. The input/output choke coils L1 and L3, the primary coil, and the secondary coil of the transformer Tr are wound around a common core (e.g. EI core) and the coils are arranged in a direction of canceling DC fluxes generated by the windings of the coils.

Figure 2:
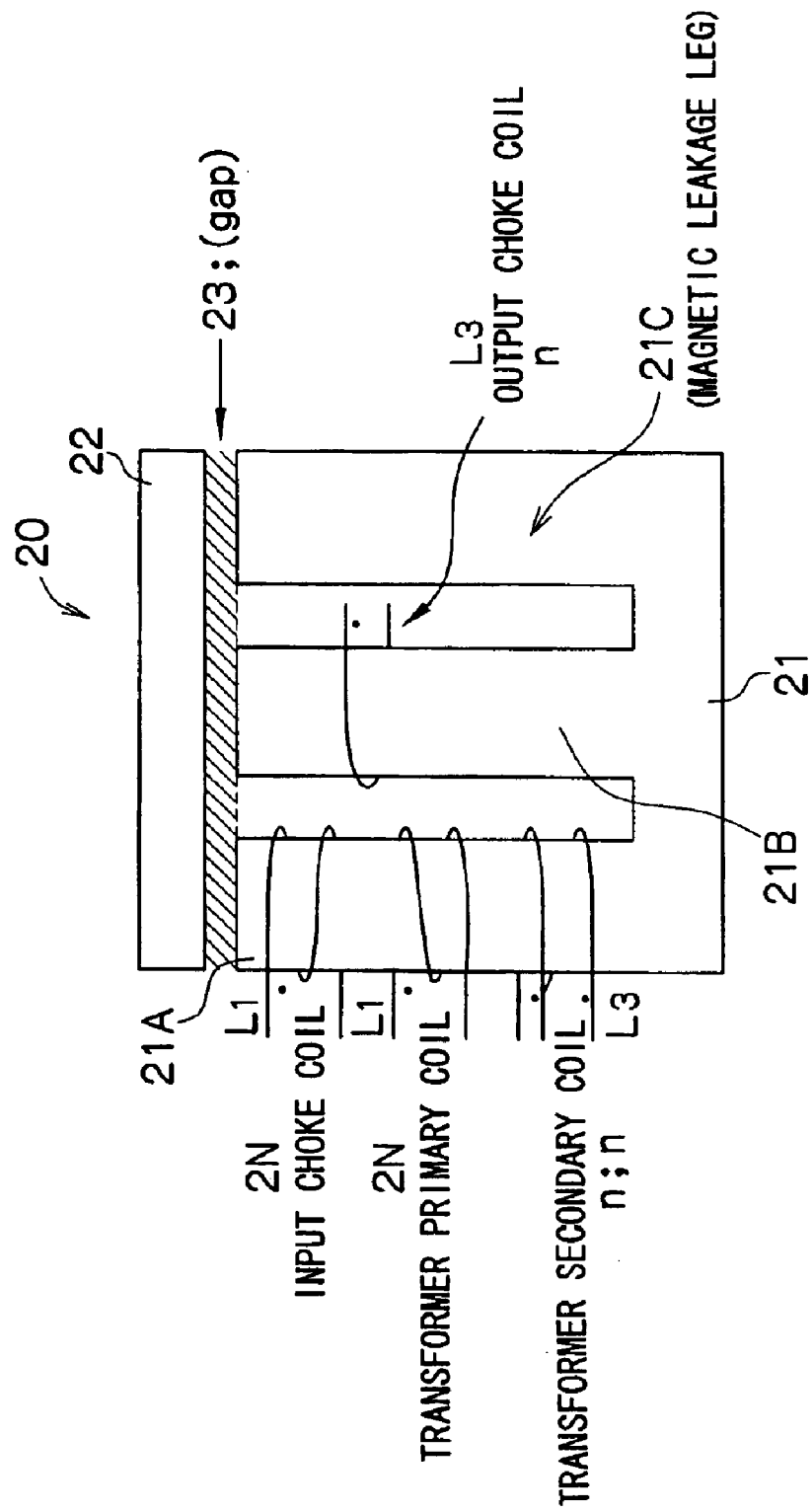
FIG. 2 is a diagram showing an example using an EI core.

FIG. 2 shows an example using an EI core. As shown in FIG. 2, an EI core 20 has a combination of an E core 21 and an I core 22. A gap 23 is provided on a connecting surface between the I core 22 and three magnetic legs 21A, 21B, and 21C of the E core 21.

As shown in FIG. 2, the input choke coil L1 and the primary coil (2N) and the secondary coil (n, n) of the transformer Tr are wound around the outer magnetic leg 21A of the E core 21. The output choke coil L3 with the number of turns n is wound around the central magnetic leg 21B. In FIG. 2, the outer magnetic leg 21C on the right is a magnetic leakage leg where a leakage flux flows.

As indicated by dots (•), the directions of the windings of the coils wound around the outer magnetic leg 21A and the central magnetic leg 21B are arranged so that magnetomotive forces cancel each other, which are generated on the coils when current is applied to the windings. In this way, a plurality of windings are combined and are arranged in directions of canceling DC fluxes, so that the core can be considerably reduced in DC bias magnetization.

Thus, the volume of the overall core can be smaller, core losses can be reduced, and the overall apparatus can be improved in efficiency. The shape of the core is not limited to the EI core and an EE core and other shapes are also applicable in the implementation of the present invention.

The following will discuss the operation of the circuit shown in FIG. 1.

Figure 3:
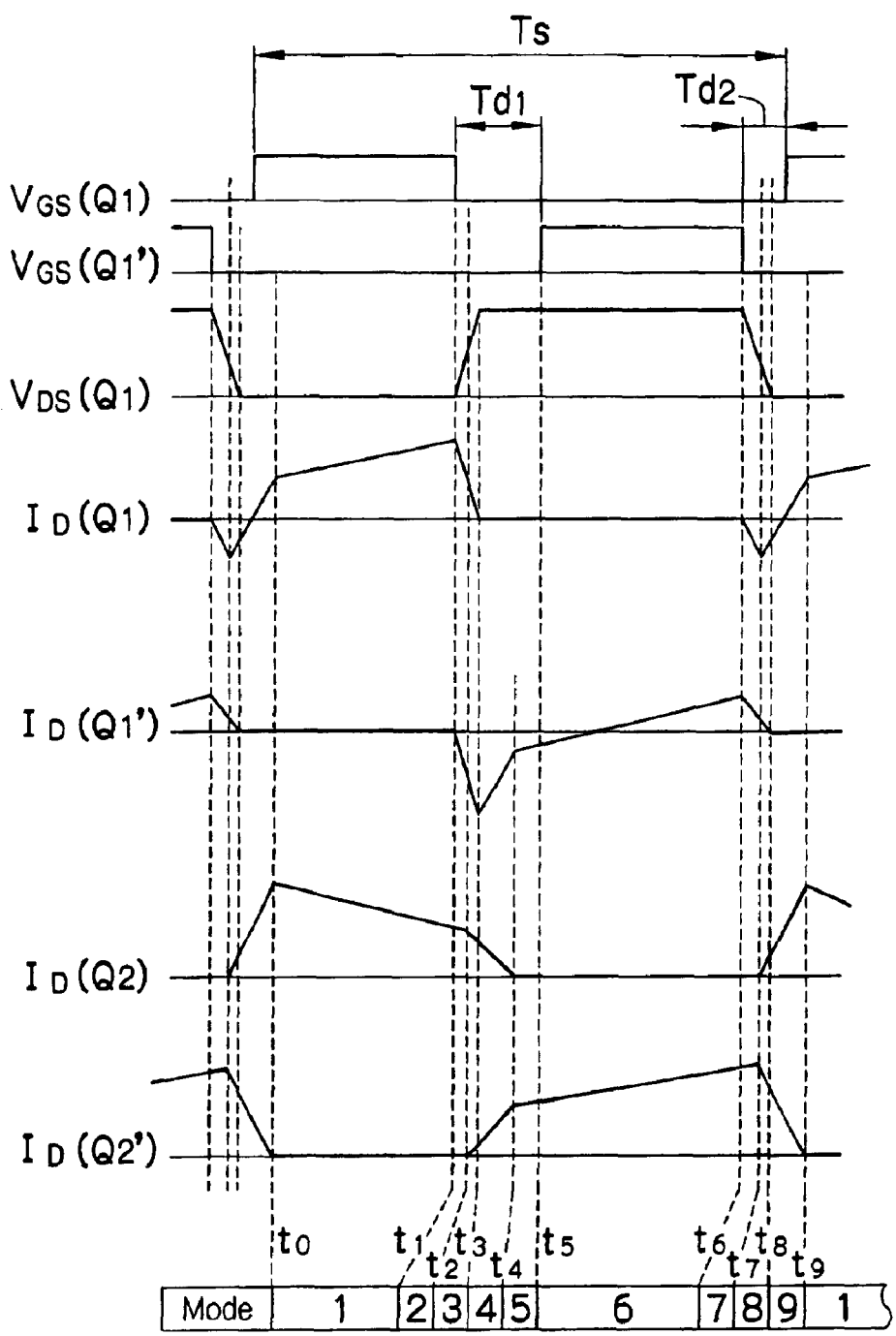
FIG. 3 is a diagram showing the operation waveforms of parts of the circuit shown in FIG. 1.

FIG. 3 shows the operation waveforms of parts of the circuit shown in FIG. 1. In FIG. 3, periods other than mode 1 and mode 6 are shorter in reality.

In FIG. 3, reference characters VGS(Q1) and VGS(Q1') designate gate voltages of the switching devices Q1 and Q1', respectively. A control circuit (not shown) performs on/off control alternately on the two switching devices Q1 and Q1' so that one of the devices is turned off in a period when the other device is turned on, except for the periods of dead times Td1 and Td2. The output DC voltage $V_O$ can be controlled by changing a ratio of an on period to a duty cycle $T_S$ of the switching devices Q1 and Q1' (on duty ratio D). That is, the output DC voltage $V_O$ satisfies the formula below.

$$V_O=(n/N) \times D \times Vi \qquad \text{[Formula 1]}$$

In FIG. 3, reference numeral VDS(Q1) designates the waveform of the drain-to-source voltage of the switching device Q1. Reference character ID(Q1) designates a sum of currents flowing to the switching device Q1, a body diode D1, and an output junction capacity C11. Reference character ID(Q1') designates a sum of currents flowing to the switching device Q1', a body diode D1', and an output junction capacity C12. Reference character ID(Q2) designates a sum of currents flowing to the switching device Q2 and a body diode D2. Reference character ID(Q2') designates a sum of currents flowing to the switching device Q2' and a body diode D2'.

In the present embodiment, the DC/DC converter circuit is divided into nine operating states of modes 1 to 9. The operations will be outlined below with reference to equivalent circuits corresponding to the modes. FIGS. 4 to 12 show the equivalent circuits of modes 1 to 9.

[1] Mode 1; $t0 \leq t \leq t1$

Figure 4:
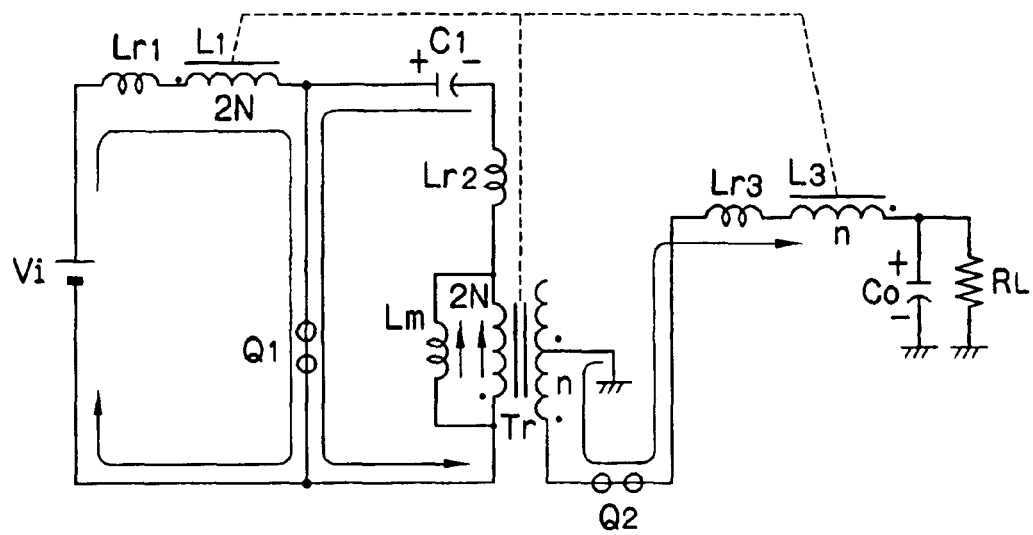
FIG. 4 is an equivalent circuit diagram showing the operation of mode 1 in the DC/DC converter of the present embodiment.

As shown in FIG. 4, in the period of mode 1, the switching devices Q1 and Q2 are turned on. Current applied from the input voltage source Vi to the input choke coil L1 and the primary current of the transformer Tr are applied to the switching device Q1. In FIG. 4, reference character RL designates a load resistance and reference character Lm designates the exciting inductance of the transformer Tr.

[2] Mode 2; $t1 \leq t \leq t2$

Figure 5:
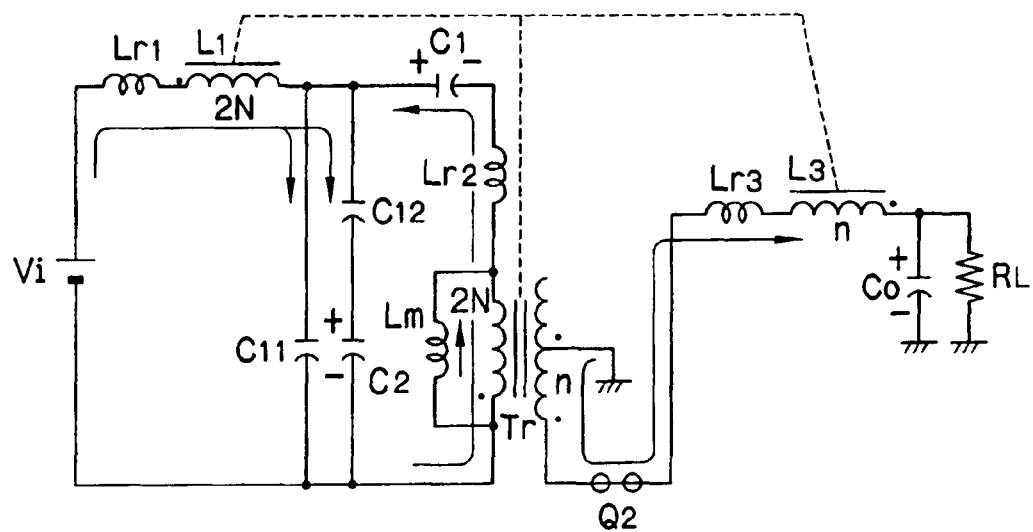
FIG. 5 is an equivalent circuit diagram showing the operation of mode 2 in the DC/DC converter of the present embodiment.

After the switching device Q1 is turned off at t=t1, as shown in FIG. 5, the output junction capacity C11 of the switching device Q1 is charged and the output junction capacity C12 of the switching device Q1' is discharged by the current of the input choke coil L1 and the primary current of the transformer Tr. Accordingly the drain-to-source voltage of the switching device Q1 increases gradually and the drain-to-source voltage of the switching device Q1' gradually decreases at the same time. Then, the transformer Tr decreases in winding voltage. Incidentally, the gate signal of the switching device Q2 is normally turned off in mode 2.

[3] Mode 3; $t2 \leq t \leq t3$

Figure 6:
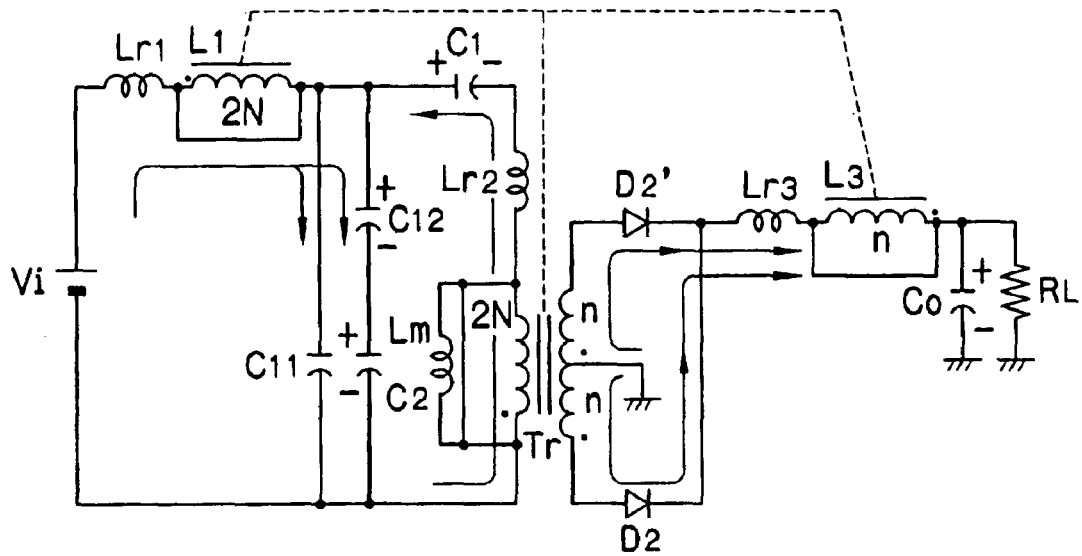
FIG. 6 is an equivalent circuit diagram showing the operation of mode 3 in the DC/DC converter of the present embodiment.

When the transformer Tr has a winding voltage of 0 at t=t2, as shown in FIG. 6, the body diode D2' of the switching device Q2' is turned on and the winding of the transformer Tr is short-circuited. The current of the output choke coil L3 flows into the body diode D2 of the switching device Q2 at the beginning but gradually flows into the body diode D2' of the switching device Q2'.

[4] Mode 4; $t3 \leq t \leq t4$

Figure 7:
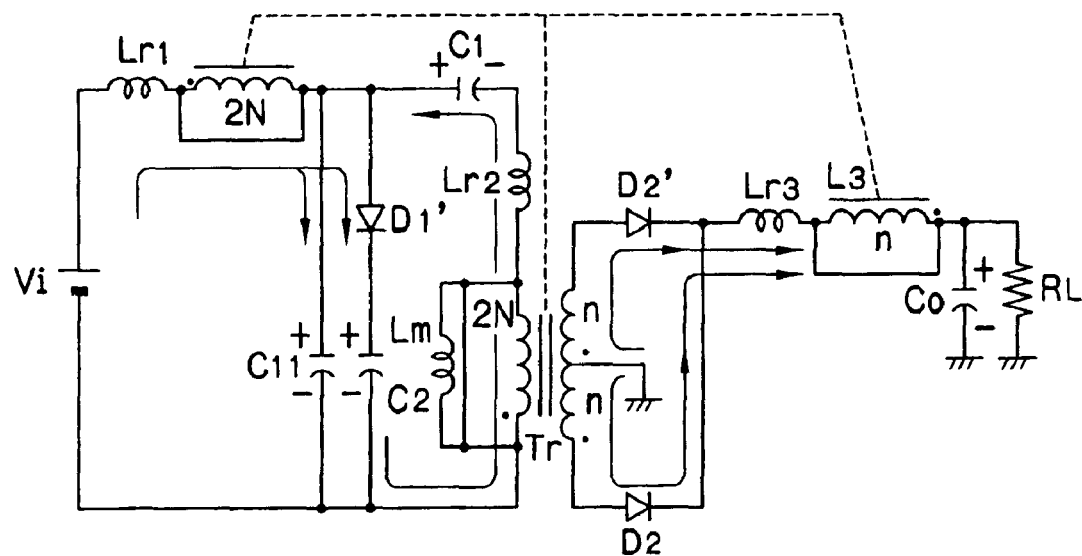
FIG. 7 is an equivalent circuit diagram showing the operation of mode 4 in the DC/DC converter of the present embodiment.

In the period of mode 4, the body diode D1' of the switching device Q1' is forward biased and turned on at t=t3 as shown in FIG. 7 and a current applied to the body diode D2 becomes 0 at t=t4.

[5] Mode 5; $t4 \leq t \leq t5$

Figure 8:
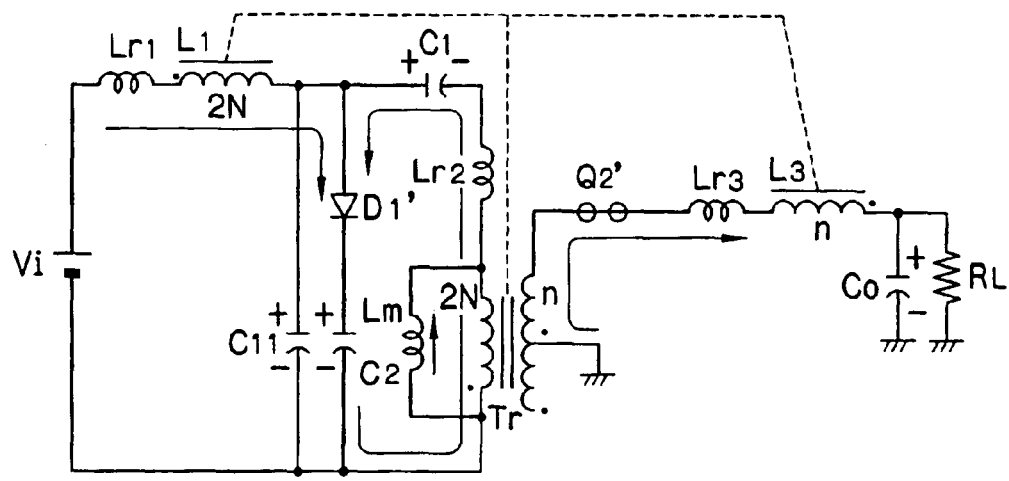
FIG. 8 is an equivalent circuit diagram showing the operation of mode 5 in the DC/DC converter of the present embodiment.

In the period of mode 5, the body diode D2 is turned off at t=t4 and the gate signal of the switching device Q1' is turned on at t=t5 as shown in FIG. 8. An on signal is applied to the gate of the switching device Q2' and the switching device Q2' is turned on in mode 5. Further, at t=t4, the windings of the transformer Tr are released from a short circuit and winding voltage is generated.

[6] Mode 6; $t5 \leq t \leq t6$

Figure 9:
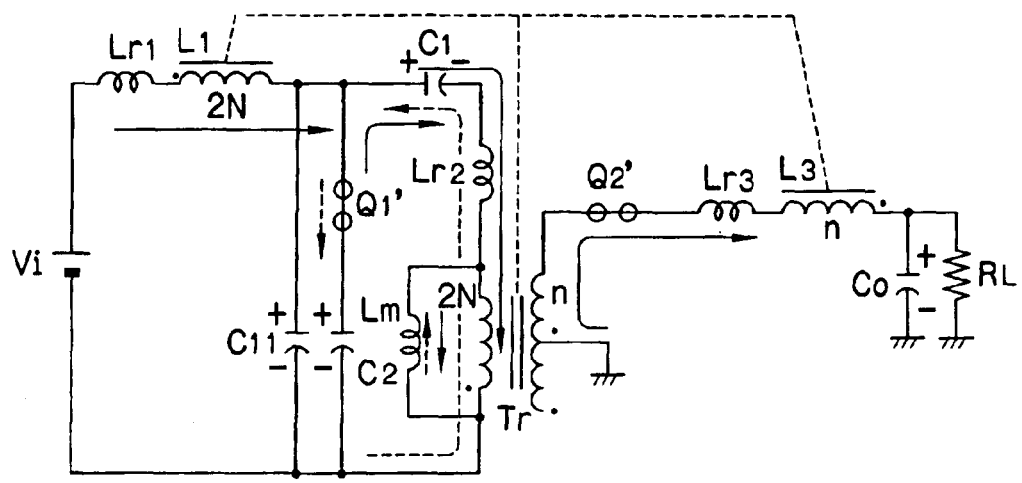
FIG. 9 is an equivalent circuit diagram showing the operation of mode 6 in the DC/DC converter of the present embodiment.

In the period of mode 6, the gate signal of the switching device Q1' is turned on at t=t5 as shown in FIG. 9 and the switching device Q1' is turned off at t=t6. During this period, the direction of the current of the switching device Q1' is changed from negative (dotted arrow in FIG. 9) to positive (solid arrow in FIG. 9).

[7] Mode 7; $t6 \leq t \leq t7$

Figure 10:
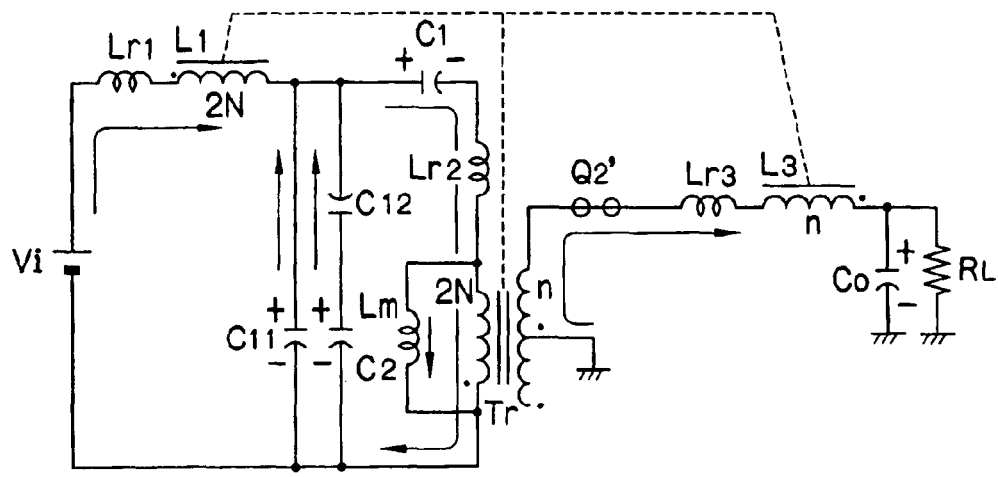
FIG. 10 is an equivalent circuit diagram showing the operation of mode 7 in the DC/DC converter of the present embodiment.

In the period of mode 7, as shown in FIG. 10, the switching device Q1' is turned off at t=t6, the drain-to-source voltage of the switching device Q1 decreases gradually, and the winding voltages of the transformer Tr decrease and become 0 at t=t7. In ordinary cases, the gate signal of the switching device Q2' is turned off in mode 7.

[8] Mode 8; $t7 \leq t \leq t8$

Figure 11:
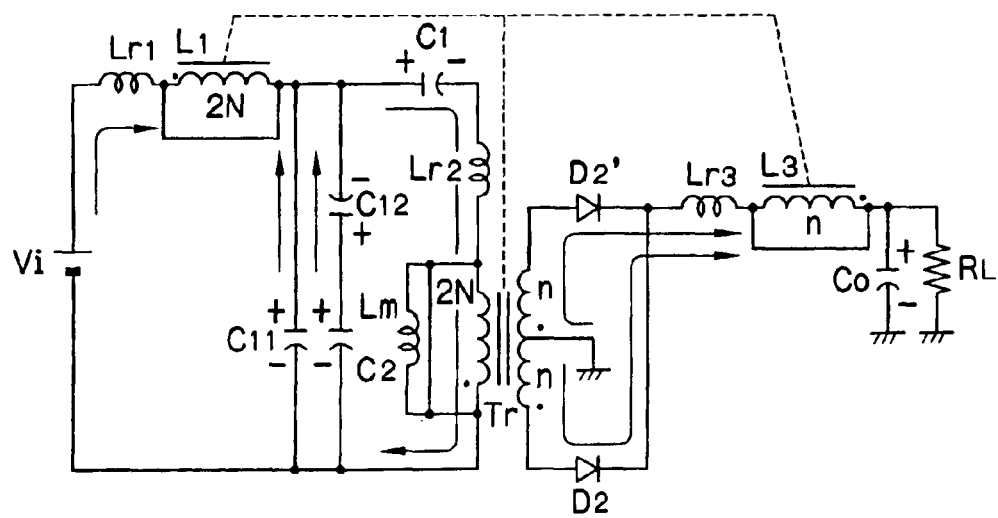
FIG. 11 is an equivalent circuit diagram showing the operation of mode 8 in the DC/DC converter of the present embodiment.

When the winding voltages of the transformer Tr become 0 at t=t7, as shown in FIG. 11, the body diode D2 of the switching device Q2 is turned on and the windings of the transformer Tr are short-circuited. The current of the output choke coil L3 flows into the body diode D2' at the beginning but gradually flows into the body diode D2. Moreover, the drain-to-source voltage of the switching device Q1 keeps decreasing during this period.

[9] Mode 9; $t8 \leq t \leq t9$

Figure 12:
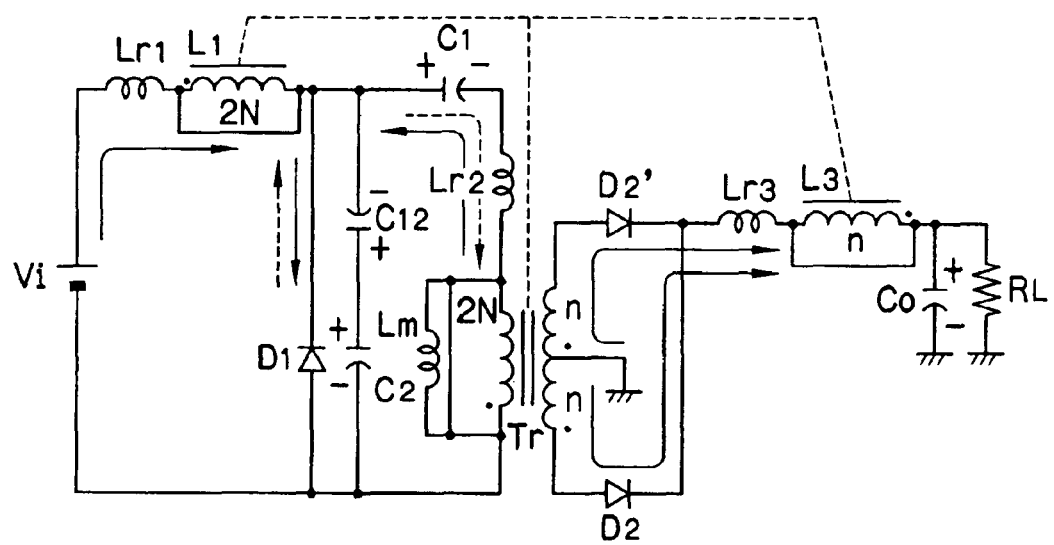
FIG. 12 is an equivalent circuit diagram showing the operation of mode 9 in the DC/DC converter of the present embodiment.

In mode 9, the body diode D1 of the switching device Q1 is forward biased at t=t8 and is turned on, and the body diode D2' of the switching device Q2' is turned off at t=t9 (FIG. 12). Further, the windings of the transformer Tr are released from the short circuit at t=t9 and winding voltage is generated. During this period, the direction of the current of the switching device Q1 is changed from negative (dotted arrow in FIG. 12) to positive (solid arrow in FIG. 12). After mode 9, a return is made to mode 1.

According to the switching DC/DC converter in the present embodiment of the present invention, the input choke coil L1, the output choke coil L3, and the transformer Tr are integrated and are arranged in directions of canceling magnetic fluxes generated by the windings to considerably reduce the DC bias magnetization of the core. Thus, as compared with the conventional circuit configuration, it is possible to considerably miniaturize the core and largely reduce core losses, thereby greatly improving the efficiency of the overall apparatus.

The applicable range of the present invention is not limited to the circuit configuration of FIG. 1 and various modifications are applicable. FIGS. 13 to 28 show modification examples of the circuit. Main differences of the circuits from the circuit of FIG. 1 will be discussed below and the explanation of operations is omitted.

Figure 13:
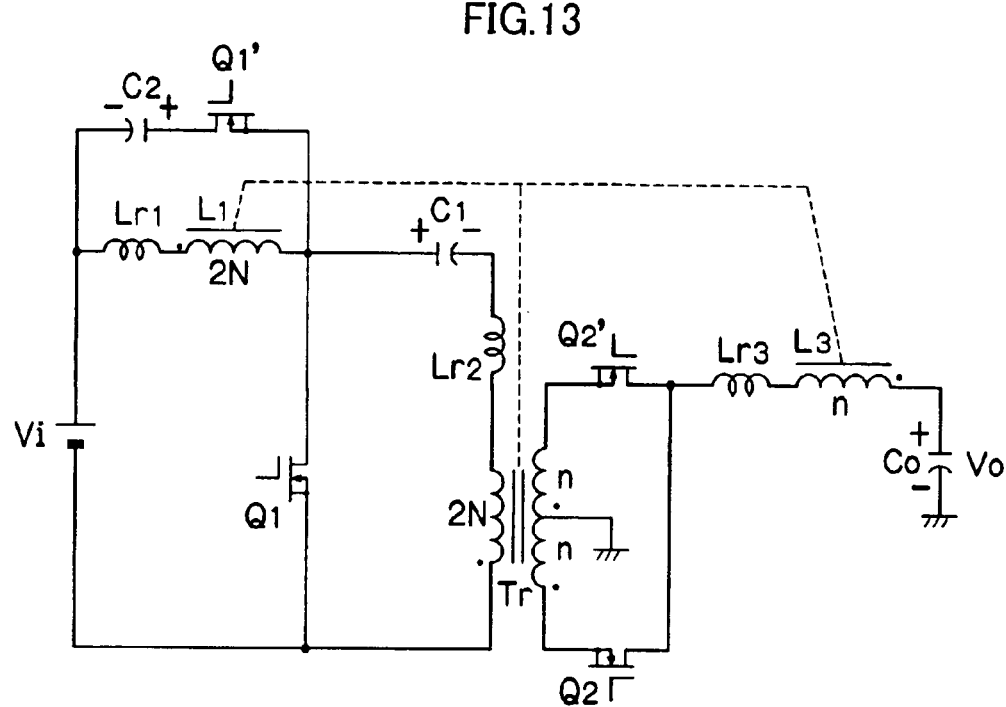
FIG. 13 is a circuit diagram showing Embodiment 2 of the present invention.

The circuit of FIG. 13 is different from the circuit of FIG. 1 in the connecting point of the series circuit of a capacitor C2 and a switching device Q1'. Others are similar to those of the circuit shown in FIG. 1.

Figure 14:
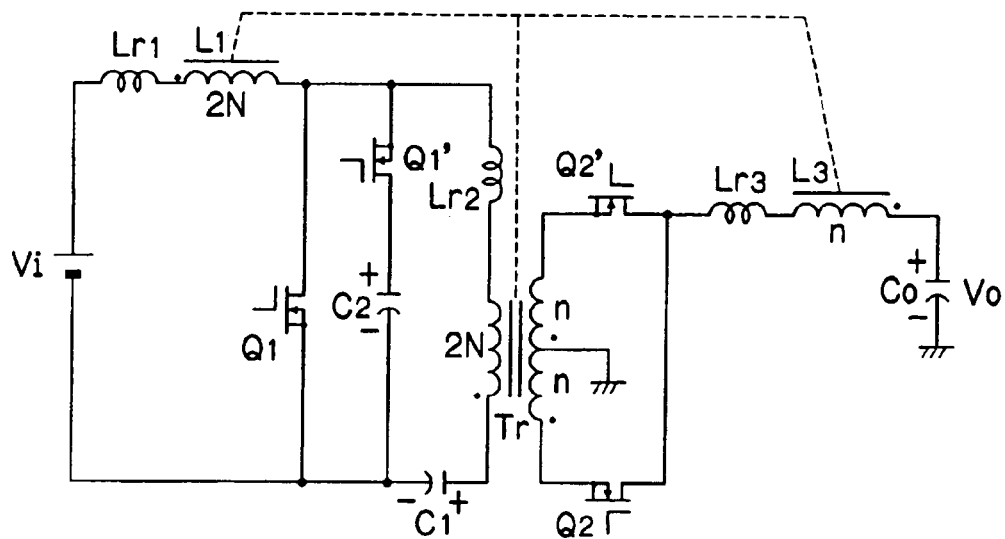
FIG. 14 is a circuit diagram showing Embodiment 3 of the present invention.

The circuit of FIG. 14 is different from that of FIG. 1 in the connecting point of a capacitor C1.

Figure 15:
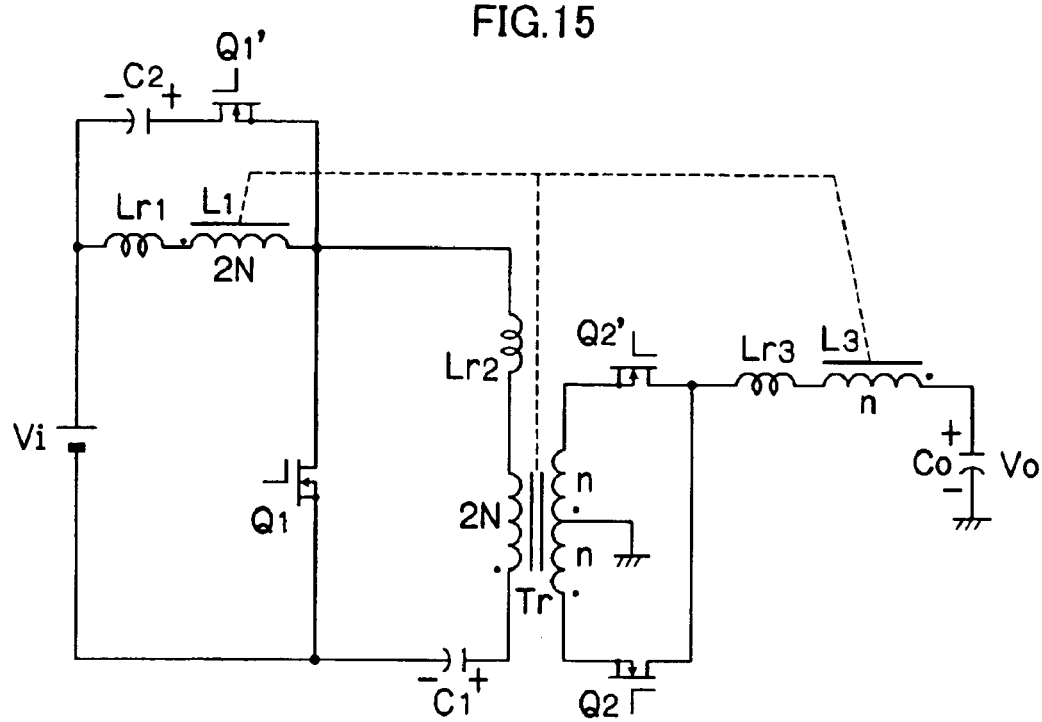
FIG. 15 is a circuit diagram showing Embodiment 4 of the present invention.

The circuit of FIG. 15 is different from that of FIG. 1 in the connecting point of the series circuit of a capacitor C2 and a switching device Q1' and the connecting point of a capacitor C1.

Figure 16:
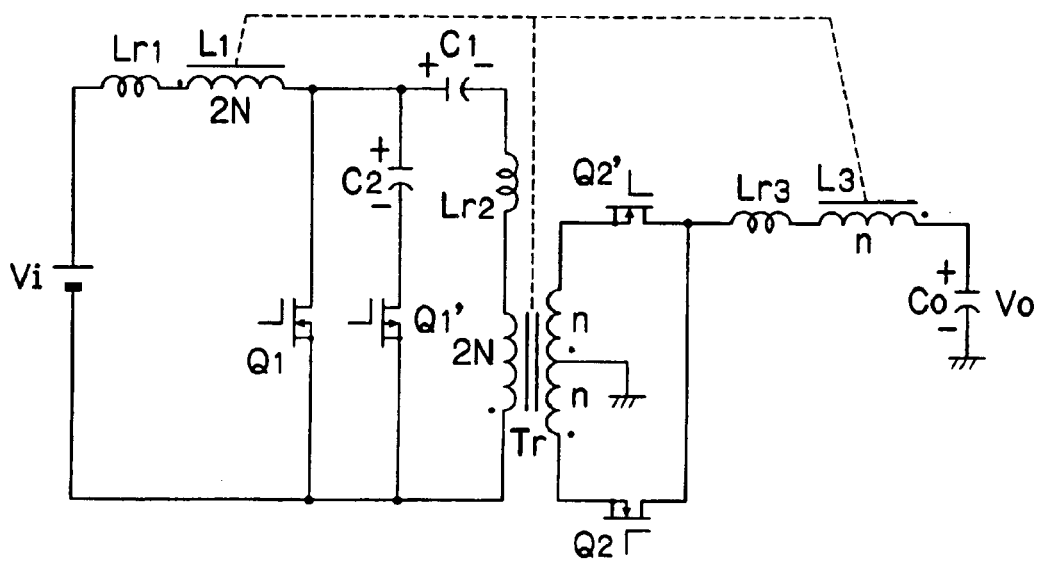
FIG. 16 is a circuit diagram showing Embodiment 5 of the present invention.

The circuit of FIG. 16 is different from that of FIG. 1 in that the connecting order of a capacitor C2 and a switching device Q1' is reversed.

Figure 17:
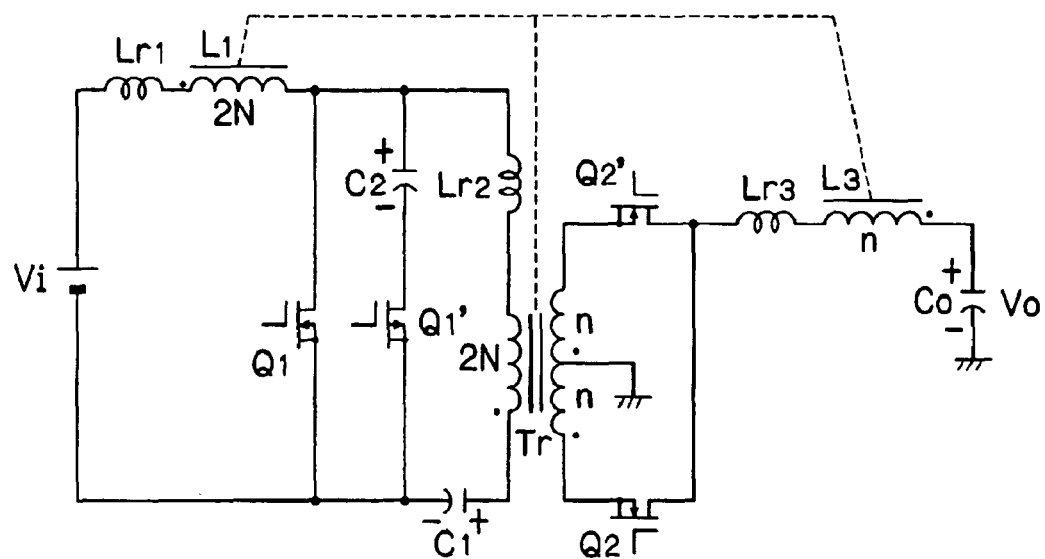
FIG. 17 is a circuit diagram showing Embodiment 6 of the present invention.

The circuit of FIG. 17 is changed in the connecting point of a capacitor C1 from FIG. 16.

Figure 18:
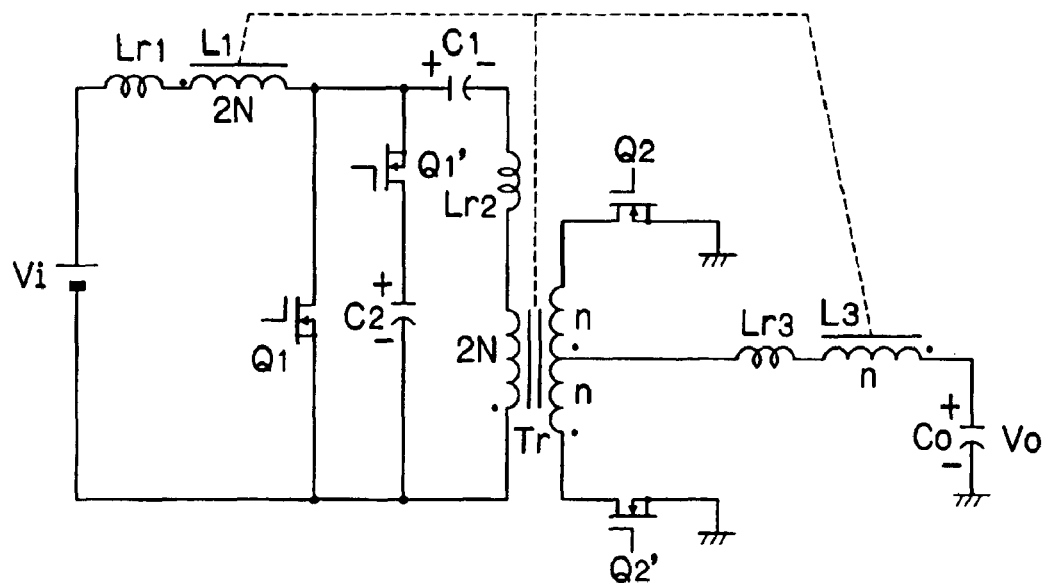
FIG. 18 is a circuit diagram showing Embodiment 7 of the present invention.

The circuit of FIG. 18 is similar to that of FIG. 1 in the configuration of the primary circuit of a transformer Tr. In a secondary circuit, an output choke coil L3 is connected to the center tap of the transformer Tr.

Figure 19:
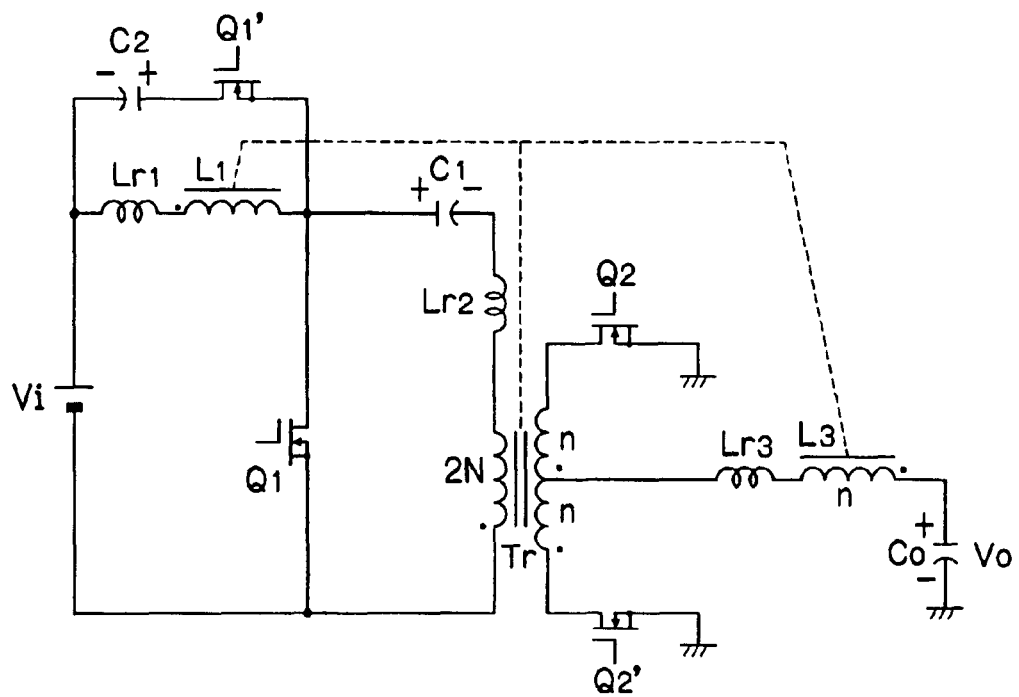
FIG. 19 is a circuit diagram showing Embodiment 8 of the present invention.

The circuit of FIG. 19 is similar to that of FIG. 13 in the primary circuit of a transformer Tr and is similar to that of FIG. 18 regarding a secondary circuit.

Figure 20:
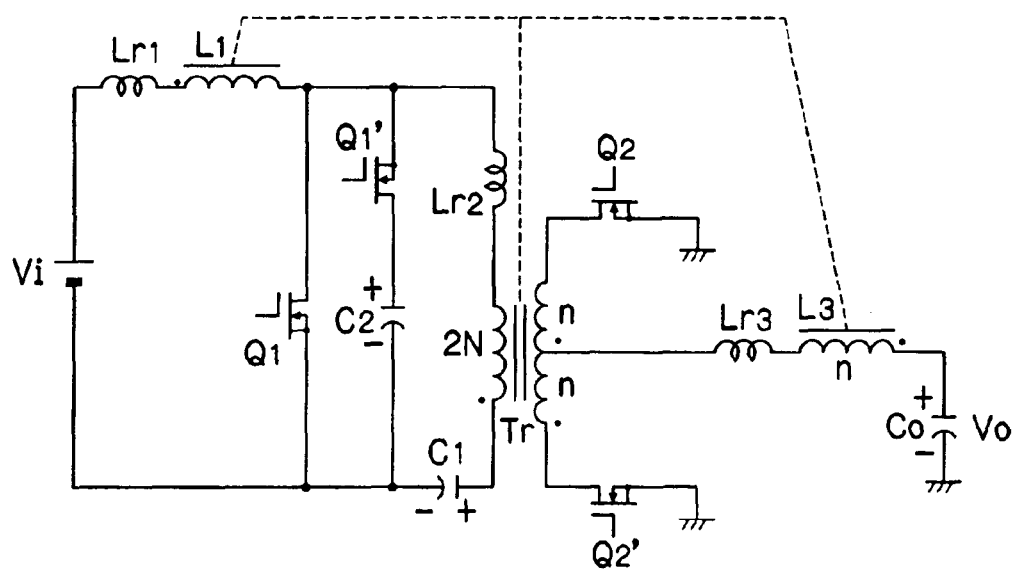
FIG. 20 is a circuit diagram showing Embodiment 9 of the present invention.

The circuit of FIG. 20 is similar to that of FIG. 14 in the primary circuit of a transformer Tr and is similar to that of FIG. 18 regarding a secondary circuit.

Figure 21:
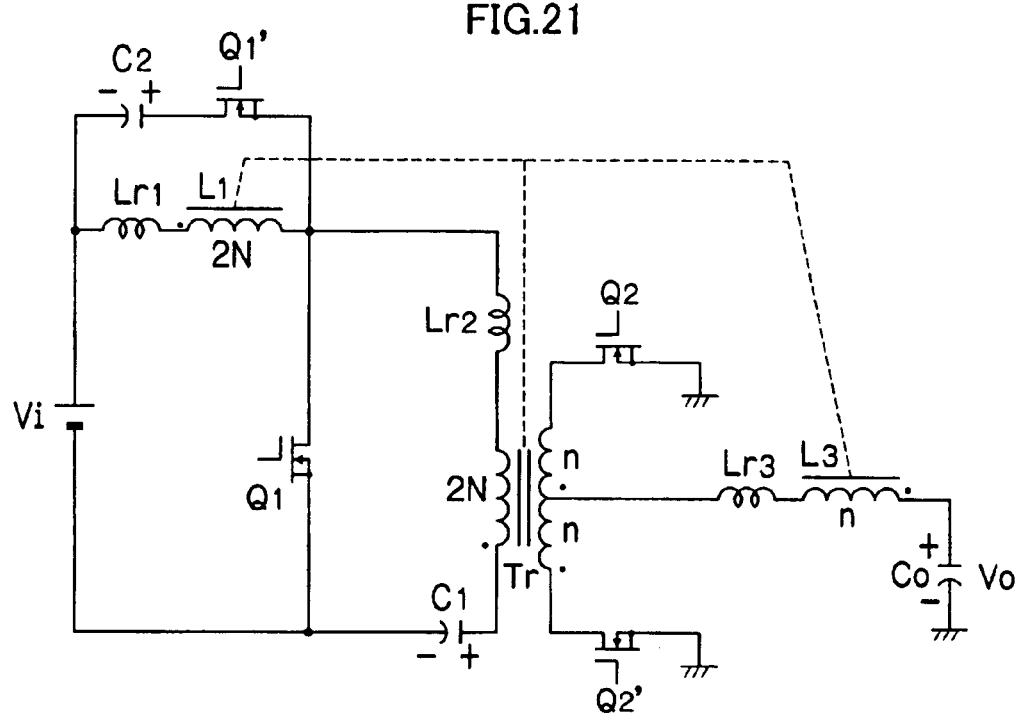
FIG. 21 is a circuit diagram showing Embodiment 10 of the present invention.

The circuit of FIG. 21 is similar to that of FIG. 15 in the primary circuit of a transformer Tr and is similar to that of FIG. 18 regarding a secondary circuit.

Figure 22:
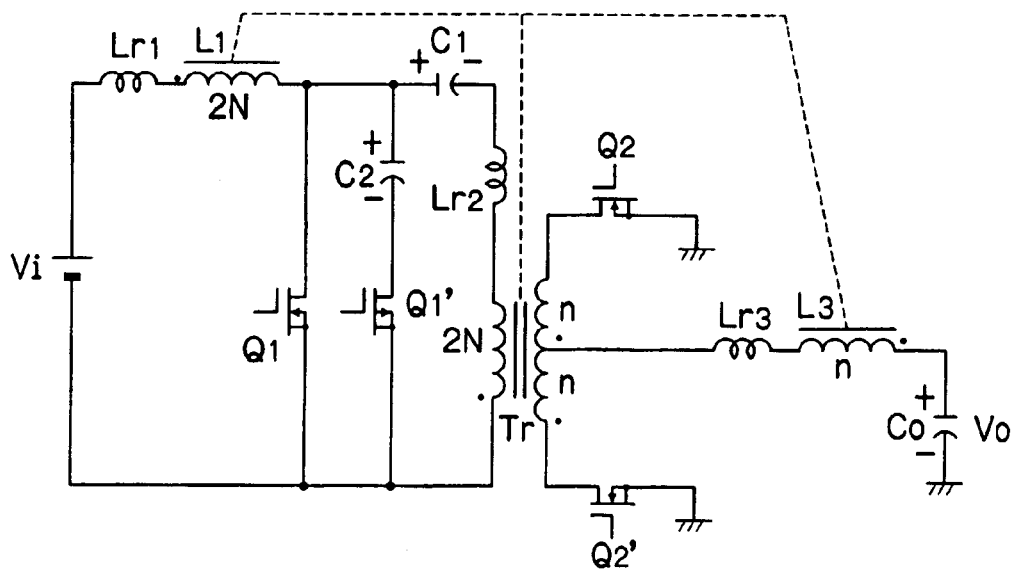
FIG. 22 is a circuit diagram showing Embodiment 11 of the present invention.

The circuit of FIG. 22 is similar to that of FIG. 16 in the primary circuit of a transformer Tr and is similar to that of FIG. 18 regarding a secondary circuit.

Figure 23:
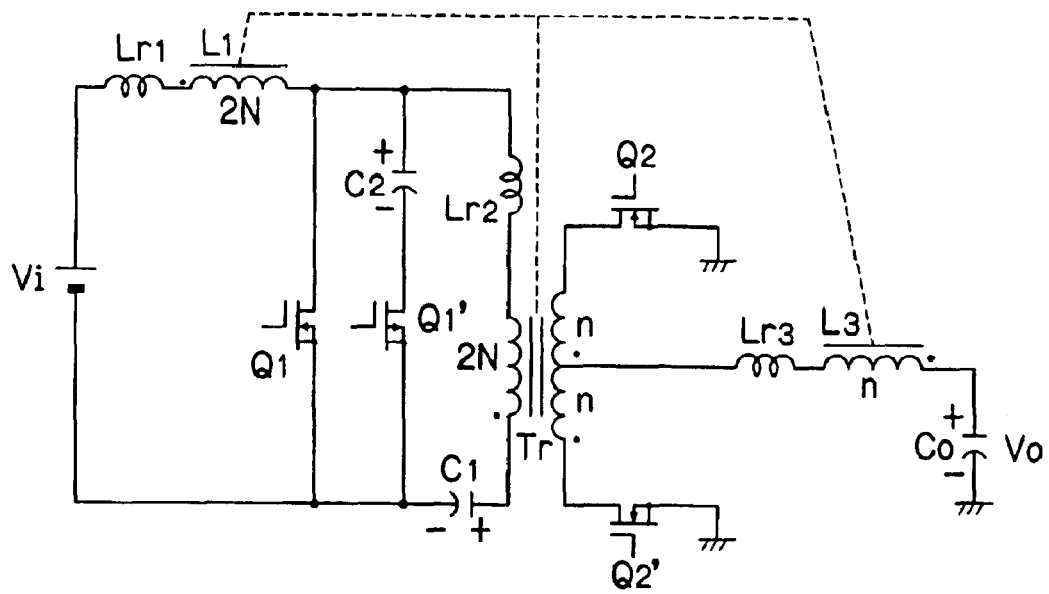
FIG. 23 is a circuit diagram showing Embodiment 12 of the present invention.

The circuit of FIG. 23 is similar to that of FIG. 17 in the primary circuit of a transformer Tr and is similar to that of FIG. 18 regarding a secondary circuit.

Figure 24:
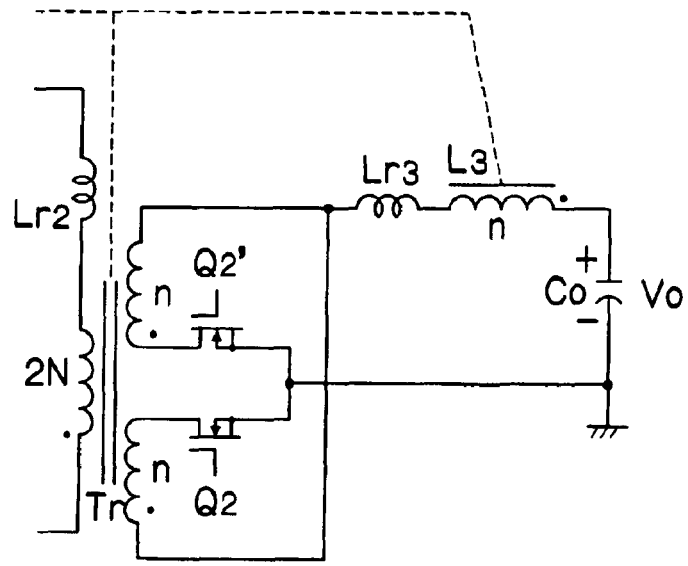
FIG. 24 is a circuit diagram showing Embodiment 13 of the present invention.
Figure 25:
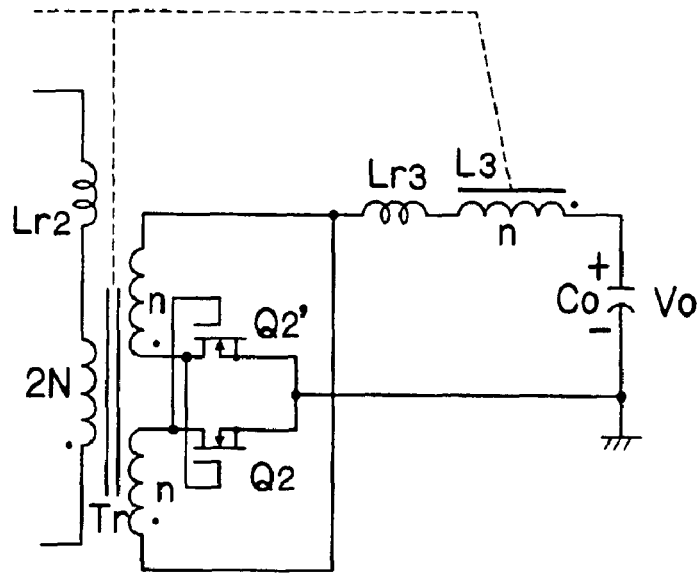
FIG. 25 is a circuit diagram showing Embodiment 14 of the present invention.
Figure 26:
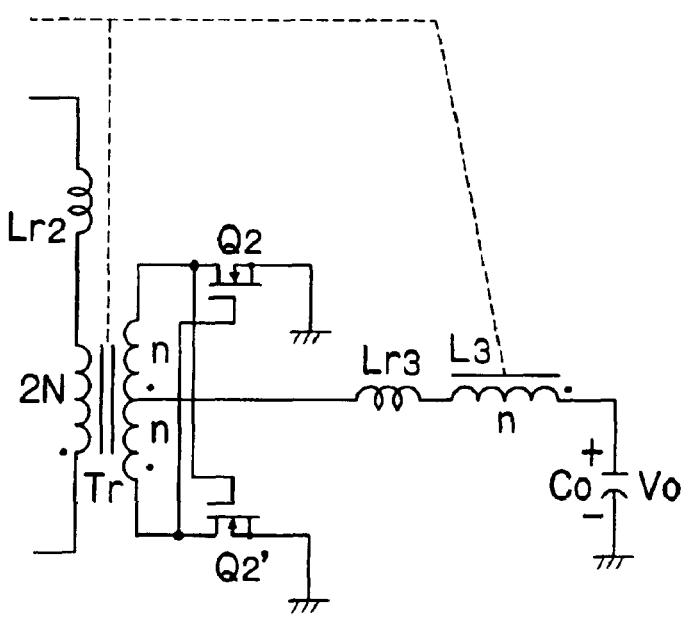
FIG. 26 is a circuit diagram showing Embodiment 15 of the present invention.

Further, the configurations of FIGS. 24 to 26 are also applicable as the secondary circuit of the transformer Tr. The circuit configuration shown in any one of FIGS. 1 and 13 to 17 can be used as the primary circuits of the transformers that are omitted in FIGS. 24 and 25.

In the examples of FIGS. 24 and 25, instead of the transformer Tr having a center tap on the secondary side, a combined transformer is used in which a first secondary coil with a number of turns n and a second secondary coil with a number of turns n are separately wound on the secondary side.

Moreover, the circuit configuration shown in any one of FIGS. 18 to 23 can be used for the primary circuit of the transformer Tr that is omitted in FIG. 26.

In the circuit examples of FIGS. 25 and 26, the gate terminals of the switching devices Q2 and Q2' are each driven by the drain-to-source voltage of the other device.

Figure 27:
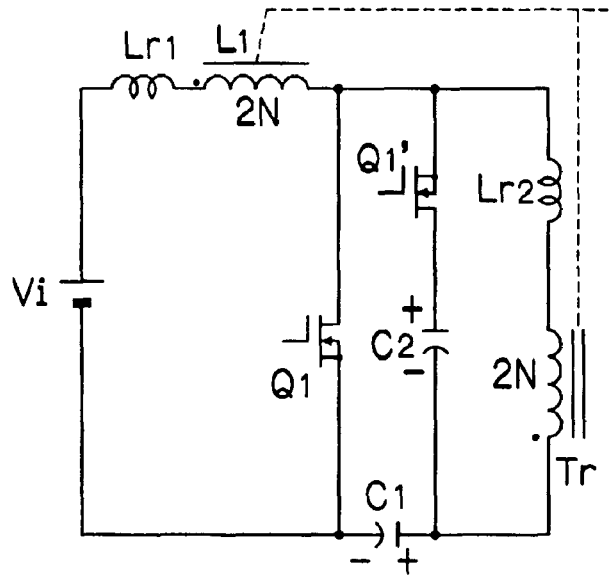
FIG. 27 is a circuit diagram showing Embodiment 16 of the present invention.
Figure 28:
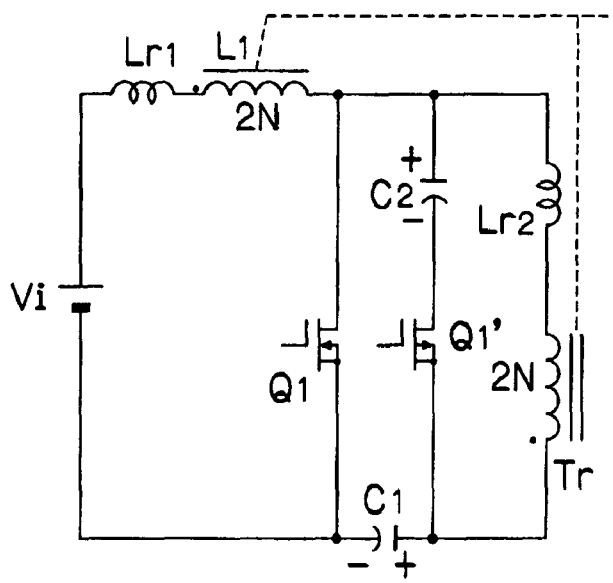
FIG. 28 is a circuit diagram showing Embodiment 17 of the present invention.
Figure 29:
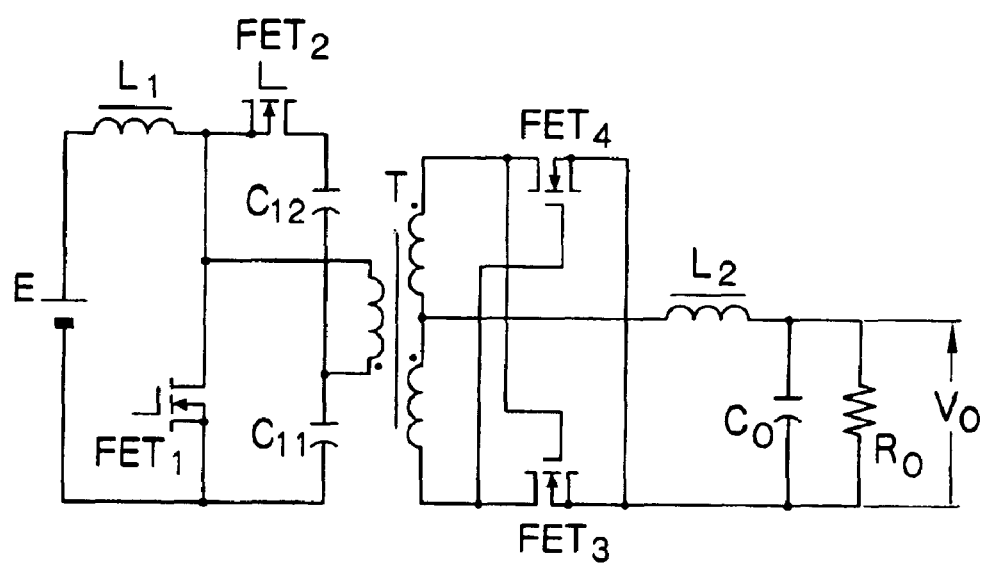
FIG. 29 is a circuit diagram showing a conventional DC/DC converter according to BHB method.

FIGS. 27 and 28 show another modification examples regarding the primary circuit of the transformer Tr. The secondary circuit of the transformer Tr is not shown in FIGS. 27 and 28. Any one of circuit configurations illustrated in FIGS. 1, 18, and 24 to 26 can be used as the secondary circuits omitted in the drawings.

The circuit of FIG. 27 is changed from the primary circuit of FIG. 20 in the connecting point of the capacitor C1. That is, in FIG. 27, the series circuit of the capacitor C1 and the primary coil of the transformer Tr is connected across the terminals of the switching device Q1, and the capacitor C1 and the series circuit of the switching device Q1', the capacitor C2, and the capacitor C1 are connected in series across the terminals of the switching device Q1.

The circuit of FIG. 28 is different from the primary circuit of FIG. 23 in that the connecting point of the capacitor C1 is changed.

The present invention is particularly beneficial to vehicles such as an electric vehicle and a hybrid car with a wide range, a high input voltage, a large capacity, and a low output voltage (e.g. input voltage: DC 200 to 400V, output voltage: 15V). As a matter of course the applicable range of the present invention is not particularly limited and the present invention is also applicable to power sources for various uses and specifications.

What is claimed is:

1. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the insulating transformer has a center tap on a secondary side, the input choke coil, a primary coil of the insulating transformer, a secondary coil of the insulating transformer, and the output choke coil are wound around a common core, and the coils are arranged in directions of canceling DC fluxes generated by windings of the coils, and wherein a primary circuit is formed on the primary side of the insulating transformer, the primary circuit being configured so that a series circuit of the input choke coil and the first switching device is connected across terminals of the DC voltage source, a series circuit of a first capacitor and the primary coil is connected across the terminals of the first switching device, and a series circuit of the second switching device and a second capacitor is connected across terminals of the first switching device, and a secondary circuit is formed on the secondary side of the insulating transformer, the secondary circuit including a first rectifying device connected to a first secondary coil divided by the center tap in the secondary coil, a second rectifying device connected to a second secondary coil, the output choke coil fed with current having been rectified by the first and second rectifying devices, and an output smoothing capacitor connected to the output choke coil.

2. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the insulating transformer has a center tap on a secondary side, the input choke coil, a primary coil of the insulating transformer, a secondary coil of the insulating transformer, and the output choke coil are wound around a common core, and the coils are arranged in directions of canceling DC fluxes generated by windings of the coils, and wherein a primary circuit is formed on the primary side of the insulating transformer, the primary circuit being configured so that a series circuit of the input choke coil and the first switching device is connected across terminals of the DC voltage source, a series circuit of a first capacitor and the primary coil is connected across terminals of the first switching device, and a series circuit of the second switching device and a second capacitor is connected in parallel with the input choke coil between a positive terminal of the DC voltage source and a negative source of the input choke coil, and a secondary circuit is formed on the secondary side of the insulating transformer, the secondary circuit including a first rectifying device connected to a first secondary coil divided by the center tap in the secondary coil, a second rectifying device connected to a second secondary coil, the output choke coil fed with current having been rectified by the first and second rectifying devices, and an output smoothing capacitor connected to the output choke coil.

3. The insulating switching DC/DC converter according to claim 1, wherein the center tap is connected to a ground and the output choke coil is connected to the first rectifying device and the second rectifying device.

4. The insulating switching DC/DC converter according to claim 1, wherein the output choke coil is connected to the center tap.

5. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the insulating transformer is a combined transformer having a first secondary coil and a second secondary coil on a secondary side, the input choke coil, a primary coil of the insulating transformer, the first secondary coil, the second secondary coil, and the output choke coil are wound around a common core, and the coils are arranged in directions of canceling DC fluxes generated by coil windings, and wherein a primary circuit is formed on the primary side of the insulating transformer, the primary circuit being configured so that a series circuit of the input choke coil and the first switching device is connected across terminals of the DC voltage source, a series circuit of a first capacitor and the primary coil is connected across terminals of the first switching device, and a series circuit of the second switching device and a second capacitor is connected across the terminals of the switching device, and a secondary circuit is formed on the secondary side of the insulating transformer, the secondary circuit including a first rectifying device connected to the first secondary coil, a second rectifying device connected to the second secondary coil, the output choke coil fed with current having been rectified by the first and second rectifying devices, and an output smoothing capacitor connected to the output choke coil.

6. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the insulating transformer is a combined transformer having a first secondary coil and a second secondary coil on a secondary side, the input choke coil, a primary coil of the insulating transformer, the first secondary coil, the second secondary coil, and the output choke coil are wound around a common core, and the coils are arranged in directions of canceling DC fluxes generated by windings of the coils, and wherein a primary circuit is formed on the primary side of the insulating transformer, the primary circuit being configured so that a series circuit of the input choke coil and the first switching device is connected across terminals of the DC voltage source, a series circuit of a first capacitor and the primary coil is connected across terminals of the first switching device, and a series circuit of the second switching device and a second capacitor is connected in parallel with the input choke coil between a positive terminal of the DC voltage source and a negative source of the input choke coil, and a secondary circuit is formed on the secondary side of the insulating transformer, the secondary circuit including a first rectifying device connected to the first secondary coil, a second rectifying device connected to a second secondary coil, the output choke coil fed with current having been rectified by the first and second rectifying devices, and an output smoothing capacitor connected to the output choke coil.

7. The insulating switching DC/DC converter according to claim 1, wherein The input choke coil and the primary coil of the insulating transformer both have a number of turns of 2N (N is a natural number), and the first secondary coil and the second secondary coil of the insulating transformer and the output choke coil each have a number of turns of n (n is a natural number).

* * * * *